United States Patent
Nakagawa

(10) Patent No.: US 9,507,422 B2
(45) Date of Patent: Nov. 29, 2016

(54) IMAGE PROCESSING DEVICE, TACTILE SENSE CONTROL METHOD, AND RECORDING MEDIUM

(71) Applicant: CANON KABUSHIKI KAISHA, Tokyo (JP)

(72) Inventor: Koichi Nakagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/557,721

(22) Filed: Dec. 2, 2014

(65) Prior Publication Data

US 2015/0160729 A1   Jun. 11, 2015

(30) Foreign Application Priority Data

Dec. 11, 2013  (JP) .................. 2013-256296

(51) Int. Cl.
   G06F 3/041    (2006.01)
   G06F 3/01     (2006.01)
   G06F 3/0488   (2013.01)
   G06F 3/0484   (2013.01)
   G06T 11/60    (2006.01)

(52) U.S. Cl.
   CPC ............ G06F 3/016 (2013.01); G06F 3/0412 (2013.01); G06F 3/0416 (2013.01); G06F 3/0488 (2013.01); G06F 3/04845 (2013.01); G06T 11/60 (2013.01)

(58) Field of Classification Search
   CPC .... G06F 3/016; G06F 3/0412; G06F 3/0416; G06F 3/0488; G06F 3/04845; G06T 11/60
   USPC ............ 345/8, 156–178, 420; 358/1.9, 496; 348/52, 349; 714/48
   See application file for complete search history.

(56) References Cited

U.S. PATENT DOCUMENTS

| | | | |
|---|---|---|---|
| 8,502,864 B1* | 8/2013 | Watkins | G03B 35/00 348/52 |
| 2005/0052428 A1* | 3/2005 | Hayashi | G06F 3/0488 345/173 |
| 2006/0010230 A1* | 1/2006 | Karklins | G05B 19/05 709/223 |

(Continued)

FOREIGN PATENT DOCUMENTS

EP    2101247 A2    9/2009
EP    2 518 595 A1    10/2012

(Continued)

OTHER PUBLICATIONS

GB Search Report dated Jul. 1, 2015, in counterpart application 1421605.5.

(Continued)

*Primary Examiner* — Prabodh M Dharia
(74) *Attorney, Agent, or Firm* — Fitzpatrick, Cella, Harper & Scinto

(57) ABSTRACT

An image processing device according to an embodiment of the invention has: a tactile sense generating unit for generating a stimulus which can be perceived by the user who is touching through a portion touched with an input unit, the input unit being provided in correspondence to a display unit for displaying a drawing object; and a control unit for controlling the tactile sense generating unit so as to generate the stimulus when a touch input is performed to a position corresponding to the drawing object of the input unit and an edit process is executed to the drawing object.

9 Claims, 5 Drawing Sheets

(56) References Cited

U.S. PATENT DOCUMENTS

| | | | |
|---|---|---|---|
| 2006/0034481 A1* | 2/2006 | Barzegar | H04H 20/76 381/401 |
| 2006/0187211 A1* | 8/2006 | Uusitalo | G06F 3/04886 345/169 |
| 2007/0116347 A1* | 5/2007 | Hong | G06T 7/0087 382/131 |
| 2007/0270658 A1* | 11/2007 | Mitchell | G09B 19/00 600/300 |
| 2008/0255782 A1* | 10/2008 | Bilac | H02J 13/001 702/62 |
| 2009/0083589 A1* | 3/2009 | Fulton | G05B 19/05 714/48 |
| 2009/0303194 A1* | 12/2009 | Kumamoto | G06F 1/3203 345/173 |
| 2010/0115455 A1* | 5/2010 | Kim | G06F 3/04815 715/781 |
| 2011/0157188 A1 | 6/2011 | Nakagawa et al. | |
| 2011/0248916 A1 | 10/2011 | Griffin et al. | |
| 2012/0139856 A1 | 6/2012 | Ise et al. | |
| 2012/0182206 A1* | 7/2012 | Cok | G02B 27/017 345/8 |
| 2012/0274576 A1 | 11/2012 | Los | |
| 2012/0327006 A1 | 12/2012 | Israr et al. | |
| 2013/0100133 A1* | 4/2013 | Elber | G06T 19/20 345/420 |
| 2013/0212470 A1* | 8/2013 | Karunamuni | G06F 17/24 715/243 |
| 2013/0217491 A1* | 8/2013 | Hilbert | A63F 13/00 463/31 |
| 2013/0271778 A1* | 10/2013 | Habu | G06K 15/02 358/1.9 |
| 2013/0308243 A1 | 11/2013 | Smoot et al. | |
| 2014/0022369 A1* | 1/2014 | Kwon | G08B 21/02 348/77 |
| 2014/0022612 A1* | 1/2014 | Fujibayashi | H04N 1/1008 358/496 |
| 2015/0015489 A1* | 1/2015 | Vaganov | G06F 3/03545 345/158 |
| 2015/0085179 A1* | 3/2015 | Van Heugten | H04N 5/23212 348/349 |
| 2015/0192996 A1* | 7/2015 | Katou | G06F 3/016 345/173 |
| 2015/0301338 A1* | 10/2015 | Van Heugten | G02C 7/04 345/8 |

FOREIGN PATENT DOCUMENTS

| | | |
|---|---|---|
| JP | 2012-124612 A | 6/2012 |
| WO | 2014-112787 A1 | 7/2014 |

OTHER PUBLICATIONS

Office Action issued in Russian Patent Application No. 2014150027, dated Jun. 29, 2016.

* cited by examiner

FIG. 5

| PEN TYPE | TYPE OF TACTILE SENSE |
|---|---|
| PENCIL | RUGGED |
| CRAYON | GRITTY |
| BRUSH | POWDERY |

FIG. 6

| (R, G, B) | TYPE OF TACTILE SENSE |
|---|---|
| (0, 0, 0) | RUGGED |
| (255, 0, 0) | GRITTY |
| (0, 0, 255) | POWDERY |

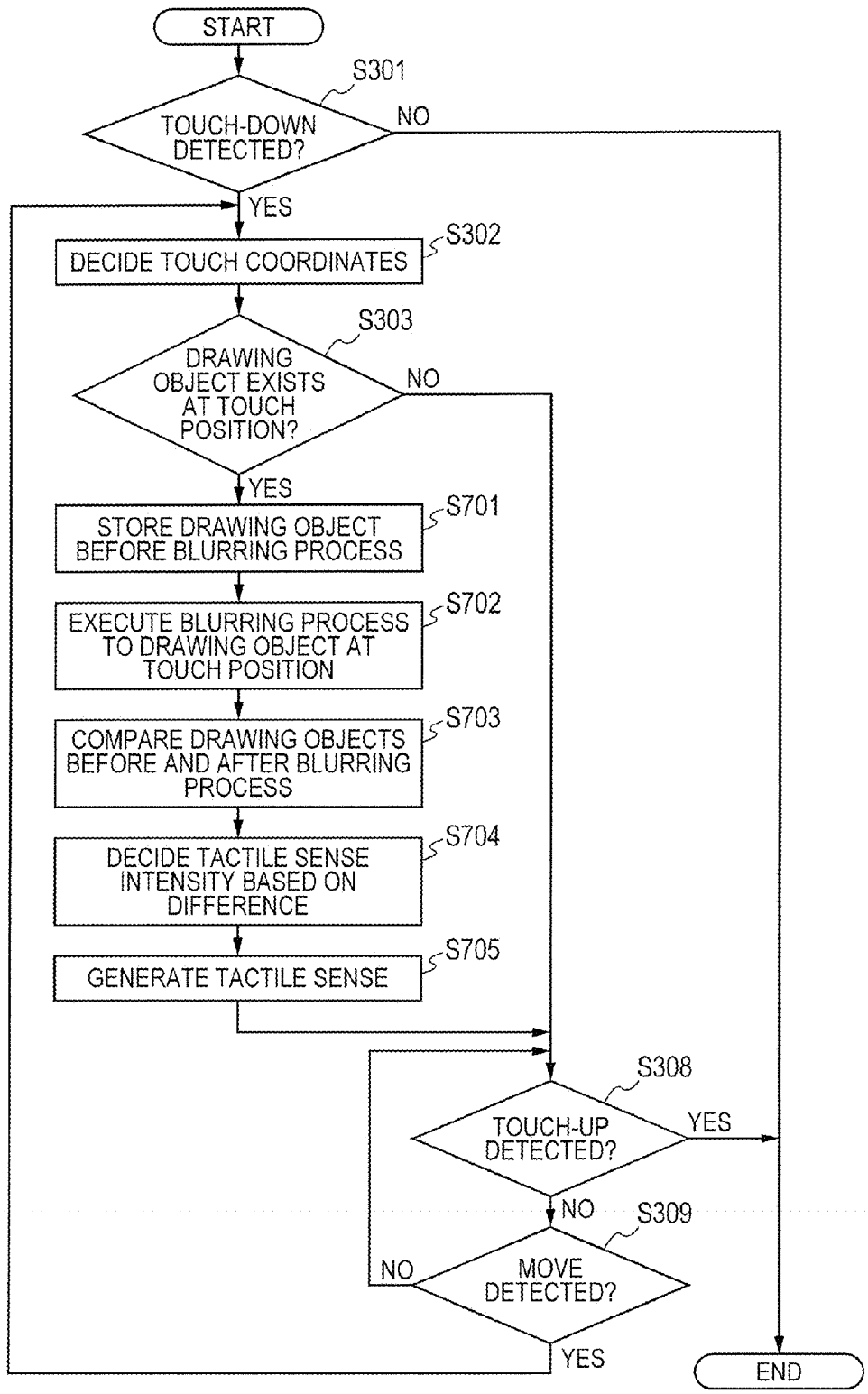

IMAGE PROCESSING DEVICE, TACTILE SENSE CONTROL METHOD, AND RECORDING MEDIUM

BACKGROUND OF THE INVENTION

Field of the Invention

The present invention relates to an image processing device, a tactile sense control method, and a recording medium.

Description of the Related Art

In recent years, the number of devices having a touch panel has increased. Owing to the feature that the user can freely designate a location on a display screen, many of these devices have an editing function for editing existing images and a painting function. As disclosed in the Official Gazette of Japanese Patent Application Laid-Open No. 2012-124612, the painting function is a function for painting and generating an image itself. In the painting function, the user can select a type and a color of a line and freely draw a line or can erase the drawn line by selecting an icon of an eraser or the like.

However, if an edit process is executed (erasure, line drawing, color painting, or the like of a drawing object) by a touch input onto an input screen provided on a display screen to the drawing object drawn on the display screen by the painting function or the like, there is the problem that it is difficult to confirm whether or not the edit process of editing the portion touched by the touch operation using a finger, a stylus pen, or the like has actually been executed. In the case of erasing the drawing object on the display screen as an edit process, the touched portion is hidden by the finger and there is the problem that it is difficult for the user to confirm whether or not the drawing object which the user wants to erase has been erased.

SUMMARY OF THE INVENTION

It is an aspect of the invention to solve all or at least one of the foregoing problems.

According to an aspect of the invention, there is provided an image processing device.

According to another aspect of the invention, there is provided a tactile sense control method.

According to a further aspect of the invention, there is provided a recording medium.

Further features of the present invention will become apparent from the following description of embodiments with reference to the attached drawings.

Each of the embodiments of the present invention described below can be implemented solely or as a combination of a plurality of the embodiments or features thereof where necessary or where the combination of elements or features from individual embodiments in a single embodiment is beneficial.

BRIEF DESCRIPTION OF THE DRAWINGS

The accompanying drawings, which are incorporated in and constitute a part of the specification, illustrate embodiments, features, and aspects of the invention and, together with the description, serve to explain the principles of the invention.

FIG. 5 is a diagram illustrating an example of a corresponding table.

FIG. 6 is a diagram illustrating an example of a corresponding table according to a modification.

FIG. 7 is a flowchart illustrating a tactile sense control process according to the third embodiment.

DESCRIPTION OF THE EMBODIMENTS

Various embodiments, features, and aspect of the invention will be described in detail below with reference to the drawings.

(First Embodiment)

Figure 1:
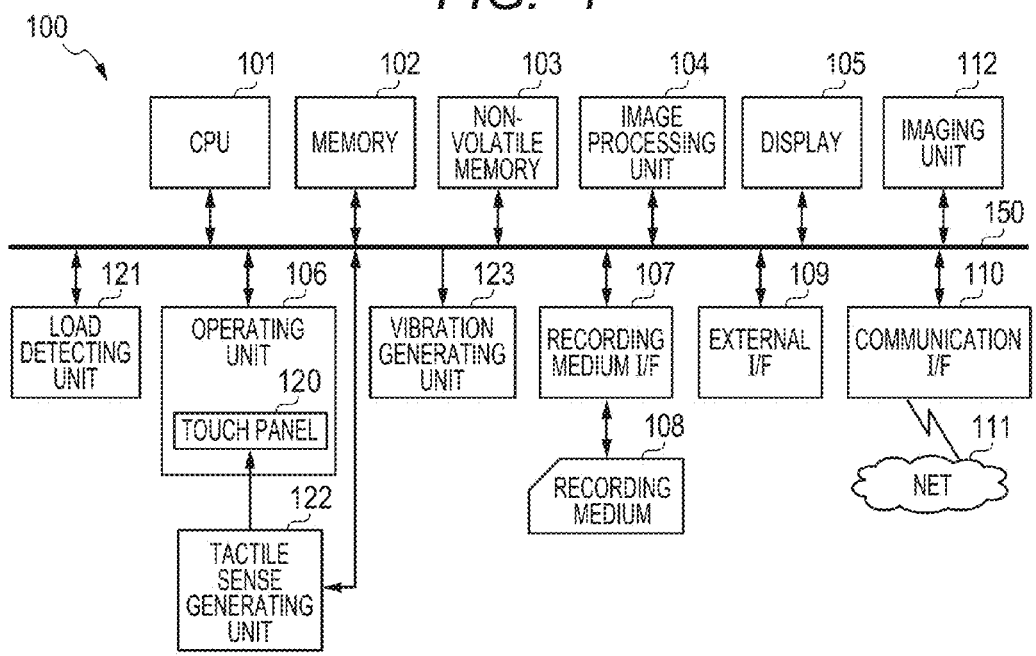
FIG. 1 is a diagram illustrating an electronic device.

FIG. 1 is a diagram illustrating an electronic device 100, serving as an image processing device, according to the first embodiment. The electronic device 100 can be constructed by a cellular phone, a smartphone, a tablet terminal, or the like. As illustrated in FIG. 1, a CPU 101, a memory 102, a non-volatile memory 103, an image processing unit 104, a display 105, an operating unit 106, a recording medium I/F (interface) 107, an external I/F 109, and a communication I/F 110 are connected to an internal bus 150. An imaging unit 112, a tactile sense generating unit 122, and a vibration generating unit 123 are also connected to the internal bus 150. Each unit connected to the internal bus 150 can mutually transmit and receive data through the internal bus 150.

The memory 102 has, for example, a RAM (volatile memory or the like using a semiconductor device). The CPU 101 controls each unit of the electronic device 100 by using the memory 102 as a work memory in accordance with a program stored in, for example, the non-volatile memory 103. Image data, audio data, other data, various kinds of programs by which the CPU 101 operates, and the like, are stored in the non-volatile memory 103. The non-volatile memory 103 has, for example, a hard disk (HD), a ROM, or the like.

The image processing unit 104 executes various kinds of image processes to the image data on the basis of control of the CPU 101. As image data that is subjected to the image processes, there are image data stored in the non-volatile memory 103 or a recording medium 108, a video signal obtained through the external I/F 109, image data obtained through the communication I/F 110, image data picked up by the imaging unit 112, and the like.

An A/D converting process, a D/A converting process, an encoding process of the image data, a compressing process, a decoding process, an enlarging/reducing process (resize), a noise reducing process, a color converting process, and the like, are included in image processes which are executed by the image processing unit 104. The image processing unit 104 is, for example, a dedicated circuit block to execute a specific image process. Instead of the image processing unit 104, the CPU 101 can also execute the image process in accordance with a program in dependence on the type of image process. The CPU 101 according to the embodiment executes a blurring filtering process.

The display 105 functioning as a display unit displays a GUI screen or the like constructing an image or a GUI (Graphical User Interface) on the basis of the control of the CPU 101. The CPU 101 controls each unit of the electronic device 100 in such a manner that a display control signal is generated in accordance with a program, a video signal to be displayed onto the display 105 is generated, and those signals are output to the display 105. The display 105 displays a video image on the basis of the video signal.

As another example, it is also possible to construct the apparatus in such a manner that the electronic device 100 does not have the display 105, has an interface to output the video signal to be displayed onto the display 105. In such a case, the electronic device 100 displays an image or the like to an externally attached monitor (television or the like).

The operating unit 106 functioning as an input unit is a character information input device, such as a keyboard or the like, or an input device for receiving the user operation, such as a pointing device like a mouse, a touch panel 120, a button, a dial, a joystick, a touch sensor, a touch pad, or the like. The touch panel 120 functioning as an input unit is overlaid onto the display 105 so as to form a flat shape, and is an input device for outputting coordinate information corresponding to a touched position. The touch panel 120 is an example of the input display screen.

The recording medium 108, such as memory card, CD, DVD, or the like, can be loaded to the recording medium I/F 107. The recording medium I/F 107 reads out data from the loaded recording medium 108 and writes data into the loaded recording medium 108 on the basis of the control of the CPU 101.

The external I/F 109 is an interface which is connected to an external device by a wired cable or in a wireless manner and is used to input and output a video signal and an audio signal. The communication I/F 110 is an interface for transmitting and receiving various kinds of data, such as file data, command data, and the like, by communicating (including a telephone communication) with the external device, the Internet 111, or the like.

The imaging unit 112 is a camera unit having an imaging element, such as CCD sensor, a CMOS sensor, or the like, a zoom lens, a focus lens, a shutter, an iris, a distance measuring unit, an A/D converter, and the like. The imaging unit 112 can pick up a still image and a moving image. Image data of the image picked up by the imaging unit 112 is transmitted to the image processing unit 104, is subjected to various kinds of processes in the image processing unit 104, and is recorded as a still image file or a moving image file into the recording medium 108.

Through an internal bus 150, the CPU 101 receives the coordinate information of the touch position which was output from the touch panel 120. The CPU 101 detects the following operations or states on the basis of the coordinate information.

- An operation to touch the touch panel 120 with a finger or stylus pen (hereinbelow referred to as "Touch-Down")
- A state where the touch panel 120 is touched by a finger or stylus pen (hereinbelow referred to as "Touch-On")
- An operation to move a finger or stylus pen while keeping in touch with the touch panel 120 (hereinbelow referred to as "Move")
- An operation to remove a finger or stylus pen touched with the touch panel 120 (hereinbelow referred to as "Touch-Up")
- A state where nothing is in touch with the touch panel 120 (hereinbelow referred to as "Touch-Off")

When Move is detected, the CPU 101 further discriminates a moving direction of the finger or stylus pen on the basis of a change in coordinates of the touch position. Specifically speaking, the CPU 101 discriminates a vertical component and a horizontal component in the moving direction on the touch panel 120.

The CPU 101 also detects each operation of a stroke, a flick, a drag, and the like. When a Touch-Up operation is performed from a Touch-Down operation through a Move operation, the CPU 101 detects the stroke. When a Move operation of a predetermined distance or longer and a predetermined speed or higher is detected and a Touch-Up operation is subsequently detected, the CPU 101 detects the flick. When a Move operation of a predetermined distance or longer and a speed lower than the predetermined speed is detected, the CPU 101 detects the drag. The flick is such an operation that the finger is quickly moved by a distance of a certain extent while keeping in touch with the touch panel 120 and the finger is removed from the touch panel 120 as it is. That is, the flick is such an operation that the finger quickly rubs the touch panel 120.

The touch panel 120 may use any one of various types of a touch panel, such as a resistance film type, an electric capacity type, a surface acoustic type, an infrared-ray type, an electromagnetic induction type, an image recognition type, a photosensor type, and the like.

A load detecting unit 121 is provided integrated with the touch panel 120 by adhesion or the like. The load detecting unit 121 is a strain gauge sensor. By using such a phenomenon that the touch panel 120 is bent (strained) by a small amount in accordance with the pressing force of the touch operation, the load detecting unit 121 detects a load (pressing force), which is applied to the touch panel 120. As another example, the load detecting unit 121 may be provided integrated with the display 105. In this case, through the display 105, the load detecting unit 121 detects a load applied to the touch panel 120.

The tactile sense generating unit 122 generates a tactile sense, which is applied to an operating means such as finger, stylus pen, or the like for operating the touch panel 120. That is, through the touch portion, the tactile sense generating unit 122 generates a stimulus which can be perceived by the user who is touching. The tactile sense generating unit 122 is provided so as to be integrated with the touch panel 120 by adhesion or the like. The tactile sense generating unit 122 is a piezoelectric element, more specifically, a piezoelectric vibrator and vibrates at arbitrary amplitude and frequency under the control of the CPU 101, functions as a control unit of the tactile sense generating unit 122. Thus, the touch panel 120 is curved and vibrates and a vibration of the touch panel 120 is propagated as a tactile sense to the operating means. That is, since the tactile sense generating unit 122 vibrates by itself, it gives the tactile sense to the operating means through the touch panel 120.

As another example, the tactile sense generating unit 122 may be provided so as to be integrated with the display 105. In this case, the tactile sense generating unit 122 causes the touch panel 120 to be curved and vibrate through the display 105.

The CPU 101 can generate tactile senses of various patterns by changing the amplitude and frequency of the tactile sense generating unit 122, and vibrating the tactile sense generating unit 122 by the various patterns.

The CPU 101 can control the tactile sense on the basis of the touch position detected on the touch panel 120 and the pressing force detected by the load detecting unit 121. For example, it is assumed that in correspondence to the touch operation of the operating means, the CPU 101 detects the touch position corresponding to a button icon displayed on the display 105, and the load detecting unit 121 detects the pressing force of a predetermined value or more. In this case, the CPU 101 generates vibrations before and after a period of time. Thus, the user can perceive a tactile sense like a click feeling obtained as if a mechanical button was depressed.

Further, it is assumed that the CPU 101 executes a function of a button icon only in the case where the pressing force of the predetermined value or more is detected in a state where a touch to a position of the button icon was detected. That is, when a weak pressing force is detected, like a case where the button icon was simply touched, the CPU 101 does not execute the function of the button icon. Consequently, the user can operate with a feeling similar to that in the case where the mechanical button is depressed.

The load detecting unit 121 is not limited to the strain gauge sensor. As another example, the load detecting unit 121 may have a piezoelectric element. In this case, the load detecting unit 121 detects a load on the basis of a voltage that is output from the piezoelectric element in accordance with the pressing force. Further, the piezoelectric element as a load detecting unit 121 in this case may be common to a pressure element functioning as a tactile sense generating unit 122.

The tactile sense generating unit 122 is not limited to a unit that generates the vibration by the pressure element. As another example, the tactile sense generating unit 122 may generate an electric tactile sense. For example, the tactile sense generating unit 122 has a conductive layer panel and an insulating material panel. In a manner similar to the touch panel 120, the conductive layer panel and the insulating material panel are overlaid onto the display 105 so as to form a flat shape. When the user touches the insulating material panel, positive charges are charged into the insulating material panel. That is, by charging the positive charges into the insulating material panel, the tactile sense generating unit 122 can generate a tactile sense as an electric stimulus. The tactile sense generating unit 122 may give such a feeling (tactile sense) that a skin of the user is pulled by a Coulomb force to the user.

As another example, the tactile sense generating unit 122 may have such a conductive layer panel that whether or not the positive charges are charged can be selected for every position on the panel. The CPU 101 controls a charging position of the positive charges. Thus, the tactile sense generating unit 122 can provide various tactile senses, such as a "rugged feeling", a "gritty feeling", a "powdery feeling", and the like to the user.

The vibration generating unit 123, which may be also referred to as a tactile sense generating unit together with the tactile sense generating unit 122, generates a tactile sense by vibrating the whole electronic device 100. The vibration generating unit 123 has, for example, an eccentric motor or the like and realizes a well-known vibration function or the like. Therefore, by the vibration that is generated by the vibration generating unit 123, the electronic device 100 can give the tactile sense to a hand or the like of the user who grasps the electronic device 100.

When an erasing (edit process) instruction by the touch operation to the touch panel 120 is input to the drawing object displayed on the display 105, the electronic device 100 according to the embodiment executes a tactile sense control process for giving a tactile sense to a finger or the like of the user who performed the touch input. The drawing and erasure (edit process) of the drawing object are realized by the painting function and an object drawn by the painting function is called a drawing object. The drawing object is an object showing a picture, character, or the like. The painting function will be described hereinbelow. The painting function is a function for receiving a selection of a type and a color of a pen from the user and drawing an image.

Figure 2:
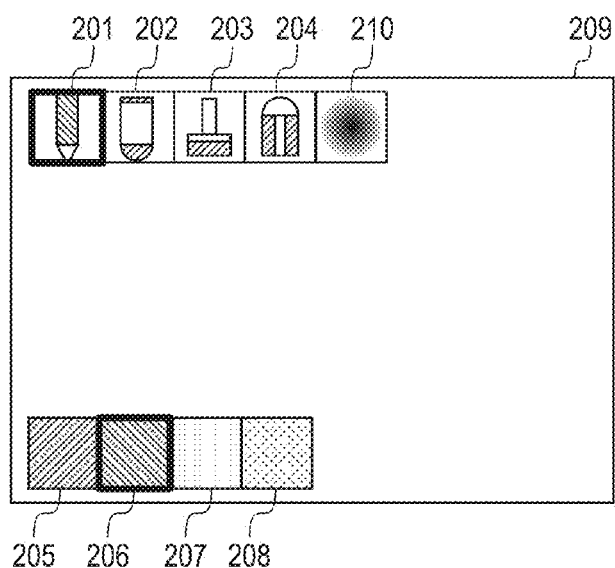
FIG. 2 is a diagram for illustrating a printing function.

FIG. 2 is a diagram illustrating an example of a painting screen that is displayed on the display 105 when the painting function is executed. In FIG. 2, an icon 201 showing a pencil, an icon 202 showing a crayon, an icon 203 showing a brush, an icon 204 showing an eraser, and a canvas 209 are displayed on the display 105. The user can select the type of pen by touching a desired one of the icons 201 to 203. It is now assumed that as pen types, a pencil, a crayon, a brush, and the like have been set. The type of line that is drawn differs in dependence on the pen type. That is, the pen type is an example of a line type.

When the user touches the canvas 209 in a state where the pen type was selected, the CPU 101 draws (edit process) a line of the selected pen type to a position on the display 105 corresponding to the touch position where the touch input has been performed. When the user touches the canvas 209 after he touched the icon of the eraser, the CPU 101 erases (edit process) the line (drawing object) drawn at the position on the display 105 corresponding to the touch position on the touch panel 120. The drawing object drawn at the position on the display corresponding to the touch position is simply called a drawing object drawn at the touch position.

Palettes 205 to 208, which are used to select the color and an icon 210 showing a blurring filter, are displayed on the display 105. When the user touches the palette of the color that he/she wants to draw, the CPU 101 changes the color at the time of drawing a line to the color of the selected palette. When the user touches the canvas 209 after he touched the icon of the blurring filter, the CPU 101 executes such a filtering process that the line drawn at the touched position is blurred.

The CPU 101 stores handwritten data showing the drawing object generated by the painting function into the memory 102. The handwritten data has information of the pen type and the color for every pixel constructing the canvas 209. The information of the color is expressed as a combination of three colors of R, G, and B and the intensity of the color is denoted by a range of 0 to 255 for every color.

It is now assumed that an upper left corner of the canvas 209 is set to an origin, a vertical direction is set to an X axis, and a horizontal direction is set to a Y axis. By designating a coordinate on the X axis and a coordinate (pixel) on the Y axis, the CPU 101 can access arbitrary handwritten data on the canvas 209. When no handwritten data exists at the designated coordinate position, the information of the pen type and the color to the designated coordinate position is not stored in the memory 102. If the handwritten data exists at the designated coordinate position, the information of the pen type and the color with the to the designated coordinates is stored in the memory 102.

When the eraser icon is selected and the erasing function is used, the CPU 101 erases (edit process) the line (drawing object) drawn at the coordinates of the touch position. Specifically speaking, to the pixel at the touch position, the CPU 101 sets (edit process) a pixel value of the color designated as a background color in place of the pixel value of the drawing object, thereby erasing the drawing object.

Figure 3:
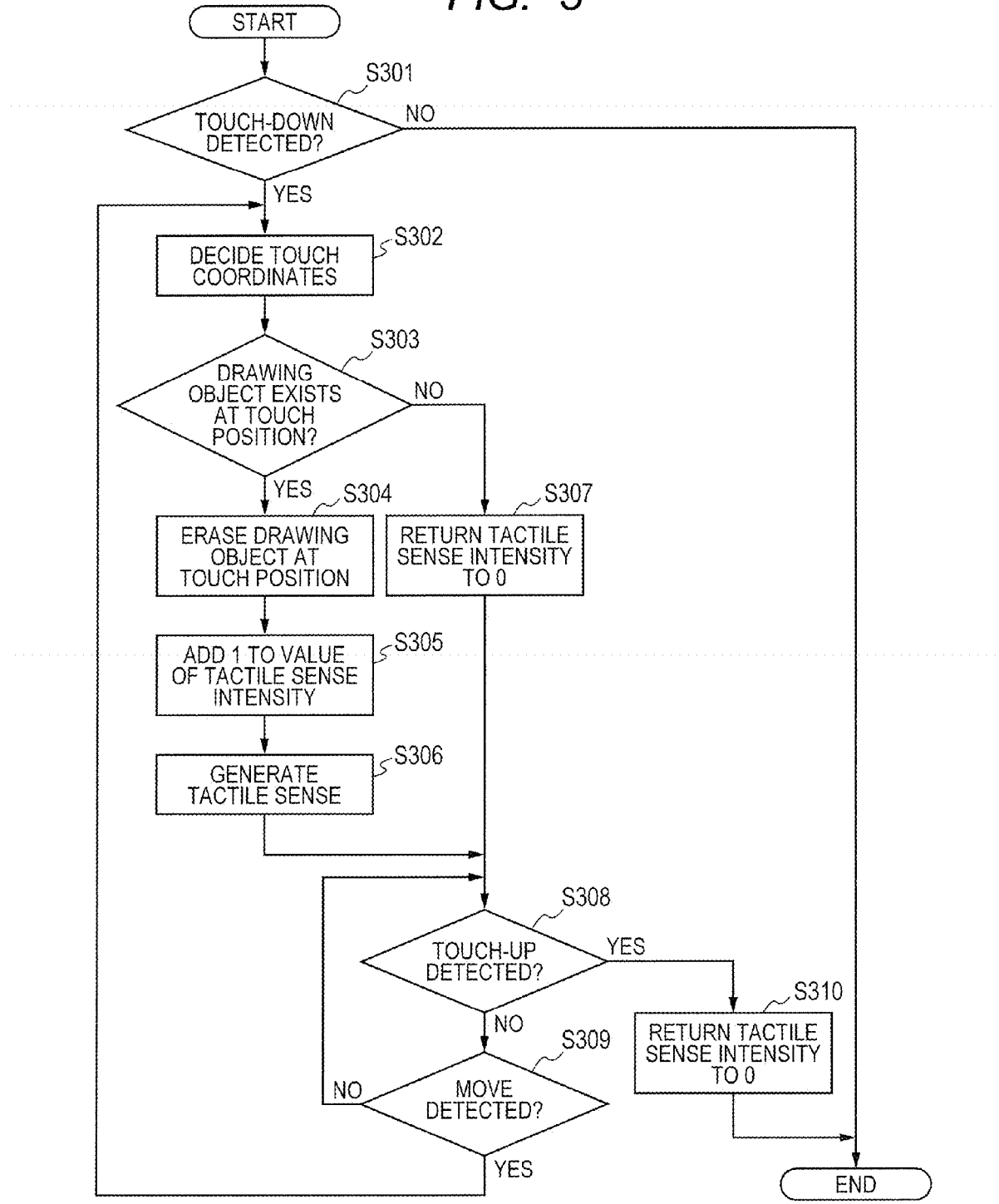
FIG. 3 is a flowchart illustrating a tactile sense control process according to the first embodiment.

FIG. 3 is a flowchart illustrating a tactile sense control process performed by the electronic device 100 in the embodiment. The tactile sense control process is executed in the case where the icon 204 of the eraser is selected in the painting function. The tactile sense control process is repetitively executed for a period of time during which a state where the icon 204 of the eraser has been selected is continued. The tactile sense control process is finished when the selection of the icon 204 of the eraser is cancelled. The tactile sense control process is realized by a method whereby the CPU 101 reads out and executes a program stored in the memory 102 or the non-volatile memory 103.

In S301, the CPU 101 discriminates whether or not a Touch-Down operation has been performed to the touch panel 120. If the Touch-Down operation is detected (YES in S301), the CPU 101 progresses the process to S302. If the Touch-Down operation is not detected (NO in S301), the CPU 101 finishes the tactile sense control process.

In S302, the CPU 101 determines coordinate information (hereinbelow, referred to as touch coordinates) of the touch position of the panel. Subsequently, in S303, the CPU 101 discriminates whether or not a drawing object exists at the position on the display 105 corresponding to the touch coordinates determined in S302.

If a drawing object exists (YES in S303), the CPU 101 progresses to the process to S304. If a drawing object does not exist (NO in S303), the CPU 101 progresses to the process to S307.

In S304, the CPU 101 erases the drawing object drawn at the touch position (erasing process). Subsequently, in S305, the CPU 101, also functions as a tactile sense intensity determining unit, adds "1" to the value of the tactile sense intensity so as to enhance the intensity of the tactile sense that is given to the user. The tactile sense intensity is information showing the intensity of a stimulus (tactile sense) that is generated by the tactile sense generating unit 122 and can be perceived by the user. It is assumed that the tactile sense intensity has been stored in the memory 102. The larger the tactile sense intensity, the larger the stimulus (tactile sense) that is given to the user. On the basis of the tactile sense intensity stored in the memory 102, the CPU 101 controls at least one of the amplitude and the frequency of the piezoelectric element as a tactile sense generating unit 122. Thus, the tactile sense generating unit 122 can generate the stimulus (tactile sense) with the different tactile sense intensity.

Subsequently, in S306, the CPU 101 controls the tactile sense generating unit 122 so as to provide the tactile sense with the tactile sense intensity set in the memory 102 (control process). Under control of the CPU 101, at the touch position, the tactile sense generating unit 122 generates the vibration corresponding to the tactile sense intensity set in the memory 102. That is, the tactile sense generating unit 122 gives the stimulus (tactile sense) to the finger or the like serving as an operating means through the touch panel 120 as an input display screen (tactile sense generating process). As another example, the CPU 101 may execute the process of S304 after completion of the processes of S305 and S306.

In S307, the CPU 101 returns the value of the tactile sense intensity to an initial value "0". Thus, the tactile sense intensity is changed so as to minimize the tactile sense that is given to the user. In S308, the CPU 101 discriminates whether or not a Touch-Up operation has been performed on the touch panel 120. If a Touch-Up operation is detected (YES in S308), the CPU 101 progresses the process to S310. If a Touch-Up operation is not detected (NO in S308), the CPU 101 progresses the process to S309. A case where a Touch-Up operation is not detected denotes a case where the Touch-On state is continued.

In S309, the CPU 101 discriminates whether or not a Move operation has been performed to the touch panel 120. If a Move operation is detected (YES in S309), the CPU 101 progresses the process to S302. That is, the CPU 101 continues the tactile sense control process. If a Move operation is not detected (NO in S309), the CPU 101 progresses the process to S308. That is, the CPU 101 waits until a Touch-Up operation or a Move operation is detected. In S310, the CPU 101 returns the value of the tactile sense intensity to the initial value "0". The process of S310 is a process for returning to the initial setting, regarding the removal of the finger of the user from the touch panel 120 as an end of the erasing operation. In this manner, the tactile sense control process is completed.

As mentioned above, when the drawing object is erased, the electronic device 100 according to the first embodiment generates a tactile sense. Thus, the electronic device 100 can allow the user to intuitively recognize the fact that the erasure was performed and also recognize the position where the erasure was performed. That is, the electronic device 100 can provide such a mechanism that the user can confirm whether or not the process corresponding to the operation performed by himself has been completed.

Further, in the repetitive processes of S303 to S309, each time a Move operation is detected, the tactile sense intensity is increased "1" by "1". That is, the CPU 101 determines the tactile sense intensity on the basis of an area (length of line) of a locus of the touch input. The processes of S305, S307 and S310 are shown as an example of the tactile sense intensity determining process.

The larger the object as an erasure target or the thicker the line as an erasure target, the larger the area of the touch input for erasure. On the other hand, the larger the area of the locus of the touch input, the larger the tactile sense identity of the electronic device 100 according to the embodiment. Therefore, as the area of the erasure target increases, the stronger the tactile sense obtained by the user. Consequently, the electronic device 100 according to the embodiment can allow the user to intuitively recognize which portion is being erased.

As a first modification of the first embodiment, the CPU 101 may erase the drawing object by changing (edit process) the color of the drawing object at the touch position to a transparent color. For example, it is assumed that the painting function has a function that can edit the image in a plurality of display layers. In this case, since the drawing object is changed to the transparent color, the image in the lower display layer is displayed at the touch position. If the lower display layer does not exist, since the drawing object is changed to the transparent color, a UI, such as touch buttons, a menu, and the like is displayed at the touch position so as to be penetrating.

As a second modification, in S306, the CPU 101 may control the vibration generating unit 123 in place of the tactile sense generating unit 122. Specifically speaking, the tactile sense intensity of the vibration generating unit 123 has been stored in the memory 102. In S305, the CPU 101 adds "1" to the value of the tactile sense intensity of the vibration generating unit 123. In S306, the CPU 101 controls the vibration generating unit 123 so as to provide the tactile sense of the tactile sense intensity set in the memory 102.

As a third modification, it is sufficient that the handwritten data showing the drawing object is information that can express the drawing object and is not limited to the information showing the pen type and the color of every set of coordinates. As another example, the handwritten data may be information having information about the shape and the size of a figure, a direction of rotation, and a position on an image, or the like.

As a fourth modification, the touch panel 120 may be arranged at a position away from the display 105. Also, in this case, the position on the touch panel 120 and the position on the display 105 are made to correspond to each other. The CPU 101 can receive an instruction input to the corresponding position on the display 105 in accordance with the touch input to each position on the touch panel 120.

(Second Embodiment)

Subsequently, the electronic device 100 according to the second embodiment will be described. In the case of erasing the drawing object drawn by the painting function, on the basis of the pen type of the drawing object as an erasure target, the electronic device 100 according to the second embodiment controls the type of tactile sense that is generated. The electronic device 100 according to the second embodiment will be described hereinbelow with respect to portions different from the electronic device according to the first embodiment.

Figure 4:
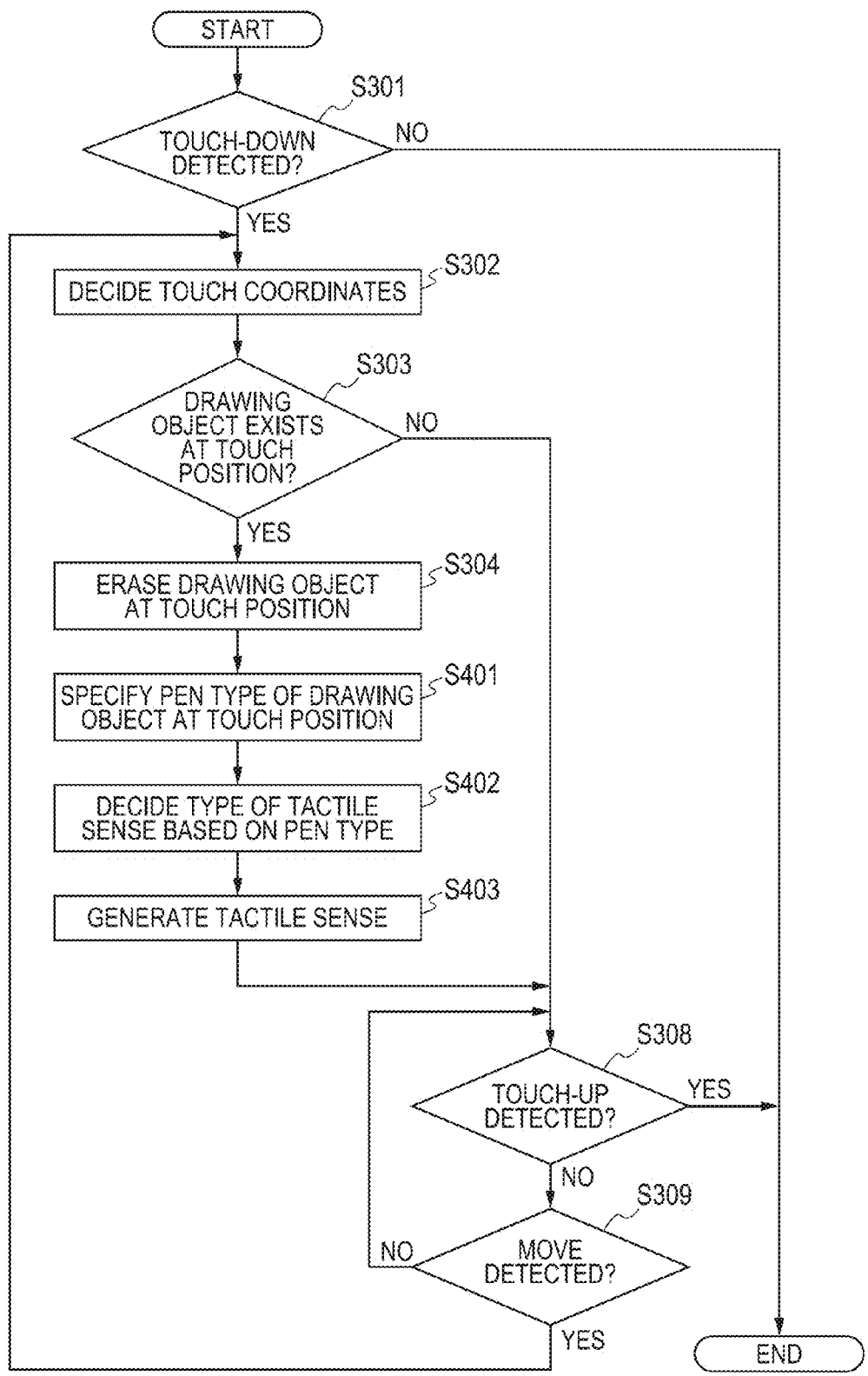
FIG. 4 is a flowchart illustrating a tactile sense control process according to the second embodiment.

FIG. 4 is a flowchart illustrating a tactile sense control process by the electronic device 100 according to the second embodiment. Among the processes in the tactile sense control process illustrated in FIG. 4, substantially the same processes as those in the tactile sense control process according to the first embodiment are designated by the same reference numerals.

In S303, the CPU 101 discriminates whether or not a drawing object exists at the touch position. If a drawing object exists, the CPU 101 progresses the process to S304. If a drawing object does not exist, the CPU 101 progresses the process to S308. After completion of the process of S304, the CPU 101, which also functions as a type specifying unit, progresses the process to S401. In S401, the CPU 101 specifies the pen type (line type) of the drawing object drawn at the touch position (type specifying process). Specifically speaking, the CPU 101 specifies the pen type corresponding to the touch coordinates obtained in S302 in the memory 102.

Subsequently, in S402, the CPU 101, also functions as a type determining unit, determines the type of tactile sense as a type of object on the basis of the pen type determined in S401 (type determining process). Specifically speaking, the CPU 101 determines the type of tactile sense on the basis of the corresponding table for making the pen type correspond to the type of tactile sense. FIG. 5 is a diagram illustrating an example of the corresponding table. In a corresponding table 501 illustrated in FIG. 5, the type of tactile sense of "rugged" is made to correspond to the pen type "pencil". In the corresponding table 501, the type of tactile sense of "gritty" is made to correspond to the pen type "crayon" and the type of tactile sense of "powdery" is made to correspond to the pen type "brush".

Returning to FIG. 4, after completion of the process of S402, the CPU 101 progresses the process to S403. In S403, the CPU 101 controls the tactile sense generating unit 122 so as to provide the tactile sense of the determined type of tactile sense (control process). On the other hand, the tactile sense generating unit 122 generates the tactile sense (vibration) of the determining type of tactile sense (tactile sense generating process).

Subsequently, in S308, if a Touch-Up operation is detected (YES in S308), the CPU 101 finishes the tactile sense control process. If a Touch-Up operation is not detected (NO in S308), the CPU 101 progresses the process to S309.

Other construction and processes of the electronic device 100 according to the second embodiment are similar to those of the electronic device 100 according to the first embodiment.

As mentioned above, the electronic device 100 according to the second embodiment can change the type of tactile sense in accordance with the pen type (line type). Therefore, the electronic device 100 can allow the user to intuitively recognize the line type of the erasure target.

As a modification of the second embodiment, the type of drawing object determined by the CPU 101 in S401 is not limited to the pen type. As another example, the CPU 101 may determine at least one of a hue, a brightness, and an intensity of the drawing object as a type of drawing object. In this case, the CPU 101 specifies the type of tactile sense by referring to a corresponding table in which the hue and the like and the type of tactile sense are made to correspond to each other.

FIG. 6 is a diagram illustrating an example of a corresponding table according to a modification of the second embodiment. In a corresponding table 601 illustrated in FIG. 6, the type of tactile sense of "rugged" is made to correspond to (R, G B)=(0, 0, 0) (black). In the corresponding table 601, the type of tactile sense of "gritty" is made to correspond to (R, G B)=(255, 0, 0) (red) and the type of tactile sense of "powdery" is made to correspond to (R, G B)=(0, 0, 255) (blue).

As another modification of the second embodiment, the CPU 101 may calculate the intensity of the drawing object drawn at the touch position and may enhance the tactile sense intensity as the intensity increases.

(Third Embodiment)

Subsequently, the electronic device 100 according to the third embodiment will be described. In the case of applying a blurring filter to the drawing object, the electronic device 100 according to the third embodiment controls the tactile sense intensity on the basis of the degree of blurring. The electronic device 100 according to the third embodiment will be described hereinbelow with respect to portions different from the electronic devices according to the other embodiments.

FIG. 7 is a flowchart illustrating a tactile sense control process by the electronic device 100 according to the third embodiment. Among the processes in the tactile sense control process illustrated in FIG. 7, substantially the same processes as those in the tactile sense control process according to the first embodiment are designated by the same reference numerals.

In S303, the CPU 101 discriminates whether or not a drawing object exists at the touch position. If a drawing object exists, the CPU 101 progresses the process to S701. If the drawing object does not exist, the CPU 101 progresses the process to S308. In S701, the CPU 101 stores the handwritten data of the drawing object that is not subjected to the blurring process into the memory 102. The handwritten data is used for comparison with the handwritten data of the drawing object obtained after the blurring process.

Subsequently, in S702, the CPU 101 executes the blurring process to the drawing object existing at the touch position and its neighborhood drawing objects. It is assumed that a range serving as a target of the blurring process has been preset as a range in which the touch position is set to the center of the range to be blurred.

Subsequently, in S703, the CPU 101 compares the drawing objects before and after the blurring process, thereby calculating a difference between them. Specifically speaking, the CPU 101 calculates the difference between color information of the drawing objects before and after the blurring process with respect to each of the colors R, G, and B. The CPU 101 executes such a process with respect to all coordinates in the range serving as a target of the blurring process and calculates the sum of processing results as a difference. The difference is shown as an example of the degree of change between the drawing objects before and after the blurring process (edit process) of the drawing object.

Subsequently, in S704, the CPU 101 determines the tactile sense intensity on the basis of the difference calculated in S703 (tactile sense intensity determining process). Specifically speaking, the CPU 101 enhances the tactile sense intensity as the difference is large. Subsequently, in S705, the CPU 101 controls (control process) the tactile sense generating unit 122 so as to give the tactile sense with the tactile sense intensity determined in S704. Under control of the CPU 101, the tactile sense generating unit 122 generates a vibration corresponding to the determined tactile sense intensity, thereby giving the tactile sense to the operating means (tactile sense generating process).

Other construction and processes of the electronic device 100 according to the third embodiment are similar to those of the electronic devices 100 according to the other embodiments.

As mentioned above, the electronic device 100 according to the third embodiment determines the tactile sense intensity in accordance with the degree of change of the drawing objects before and after the blurring process. Therefore, the electronic device 100 can allow the user to intuitively recognize the degree of change due to the blurring process.

Generally, as the blurring filter is applied to the same portion many times, an effect that is obtained every time decreases. On the other hand, the electronic device 100 according to the embodiment can give the tactile sense according to the degree of change. Therefore, the user can intuitively recognize whether or not it is effective to repetitively apply the blurring filter.

As a modification of the third embodiment, the blurring process may be executed by the image processing unit 104 in place of the CPU 101. In this case, the CPU 101 instructs the blurring process to the image processing unit 104. The image processing unit 104 executes the blurring process in response to the instruction of the CPU 101.

As another modification of the third embodiment, in an edit process other than the blurring process, the electronic device 100 may control the tactile sense intensity on the basis of the degree of change of the drawing objects before and after the edit process.

Although an example of the blurring process has been described as an editing process in the foregoing embodiment, when executing the operation for other various types of editing processes, such as an edge emphasizing process, a color converting process, and the like, the type or intensity of the generated tactile sense may be changed in accordance with characteristics of the image displayed at the touched portion.

(Other Embodiments)

Embodiment(s) of the present invention can also be realized by a computer of a system or apparatus that reads out and executes computer-executable instructions (e.g., one or more programs) recorded on a storage medium (which may also be referred to more fully as a "non-transitory computer-readable storage medium") to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. It will of course be understood that this invention has been described above by way of example only, and that modifications of detail can be made within the scope of this invention.

This application claims the benefit of Japanese Patent Application No. 2013-256296, filed Dec. 11, 2013, which is hereby incorporated by reference herein in its entirety.

What is claimed is:

1. An image processing device comprising:
a tactile sense generating unit configured to generate a stimulus which can be perceived by a user touching a portion of an input unit, the input unit being provided to a display unit for displaying a drawing object; and
a control unit configured to control the tactile sense generating unit so as to generate the stimulus when a touch input is performed to a position corresponding to the drawing object and an edit process is executed to the drawing object,
wherein the edit process is a process for erasing the drawing object, and
wherein the control unit is configured to discriminate whether or not the drawing object exists at the position where the touch input is performed, and if the drawing object exists, to erase the drawing object and control the tactile sense generating unit so as to generate the stimulus.

2. An image processing device according to claim 1, wherein the control unit is configured to erase the drawing object by changing the color of the drawing object at the position where the touch input is performed to a background color.

3. An image processing device according to claim 1, wherein the control unit is configured to erase the drawing object by changing the color of the drawing object at the position where the touch input is performed to a transparent color.

4. An image processing device according to claim 1, further comprising a tactile sense intensity determining unit configured to determine the tactile sense intensity indicating the intensity of the stimulus on a basis of an area of a locus of the touch input, and
wherein the control unit is configured to control the tactile sense generating unit so as to give a tactile sense of the tactile sense intensity determined by the tactile sense intensity determining unit.

5. An image processing device according to claim 1, further comprising
a type specifying unit configured to specify the type of the drawing object drawn at the position where the touch input is performed; and
a type determining unit configured to determine the type of the stimulus on a basis of the type specified by the type specifying unit, and wherein the control unit is configured to control the tactile sense generating unit so as to give the stimulus of the type determined by the type determining unit.

6. An image processing device according to claim 5, wherein the type specifying unit is configured to specify a line type of the drawing object as the type of the drawing object.

7. An image processing device according to claim 5, wherein the type specifying unit is configured to specify at least one of a hue, a brightness, and an intensity of the drawing object as the type of the drawing object.

8. An image processing device according to claim 1, further comprising a tactile sense intensity determining unit configured to determine the a tactile sense intensity indicating the intensity of the stimulus on a basis of the degree of change of the drawing objects before and after the edit process, and
wherein the control unit is configured to control the tactile sense generating unit so as to give a tactile sense of the tactile sense intensity determined by the tactile sense intensity determining unit.

9. A tactile sense control method which is executed by an image processing device, comprising:
a tactile sense generating step of generating a stimulus which can be perceived by a user touching a portion of an input unit, the input unit being provided in correspondence with a display unit for displaying a drawing object; and
a control step of controlling the tactile sense generating step so as to generate the stimulus when a touch input is performed to a position corresponding to the drawing object and an edit process is executed to the drawing object,
wherein the edit process is a process for erasing the drawing object, and
wherein the control step includes discriminating whether or not the drawing object exists at the position where the touch input is performed, and if the drawing object exists, erasing the drawing object and controlling the tactile sense generating unit so as to generate the stimulus.

* * * * *